(No Model.)  5 Sheets—Sheet 1.
F. J. WATERS.
OSCILLATING STEAM ENGINE.

No. 340,689.  Patented Apr. 27, 1886.

Witnesses.
S. N. Piper
R. B. Torrey

Inventor,
Frank J. Waters.
by R. H. Eddy att'y.

(No Model.)  5 Sheets—Sheet 2.

F. J. WATERS.
OSCILLATING STEAM ENGINE.

No. 340,689. Patented Apr. 27, 1886.

Witnesses.
S. N. Piper
W. B. Torrey

Inventor.
Frank J. Waters.
by R. H. Eddy atty.

(No Model.) 5 Sheets—Sheet 3.
F. J. WATERS.
OSCILLATING STEAM ENGINE.
No. 340,689. Patented Apr. 27, 1886.
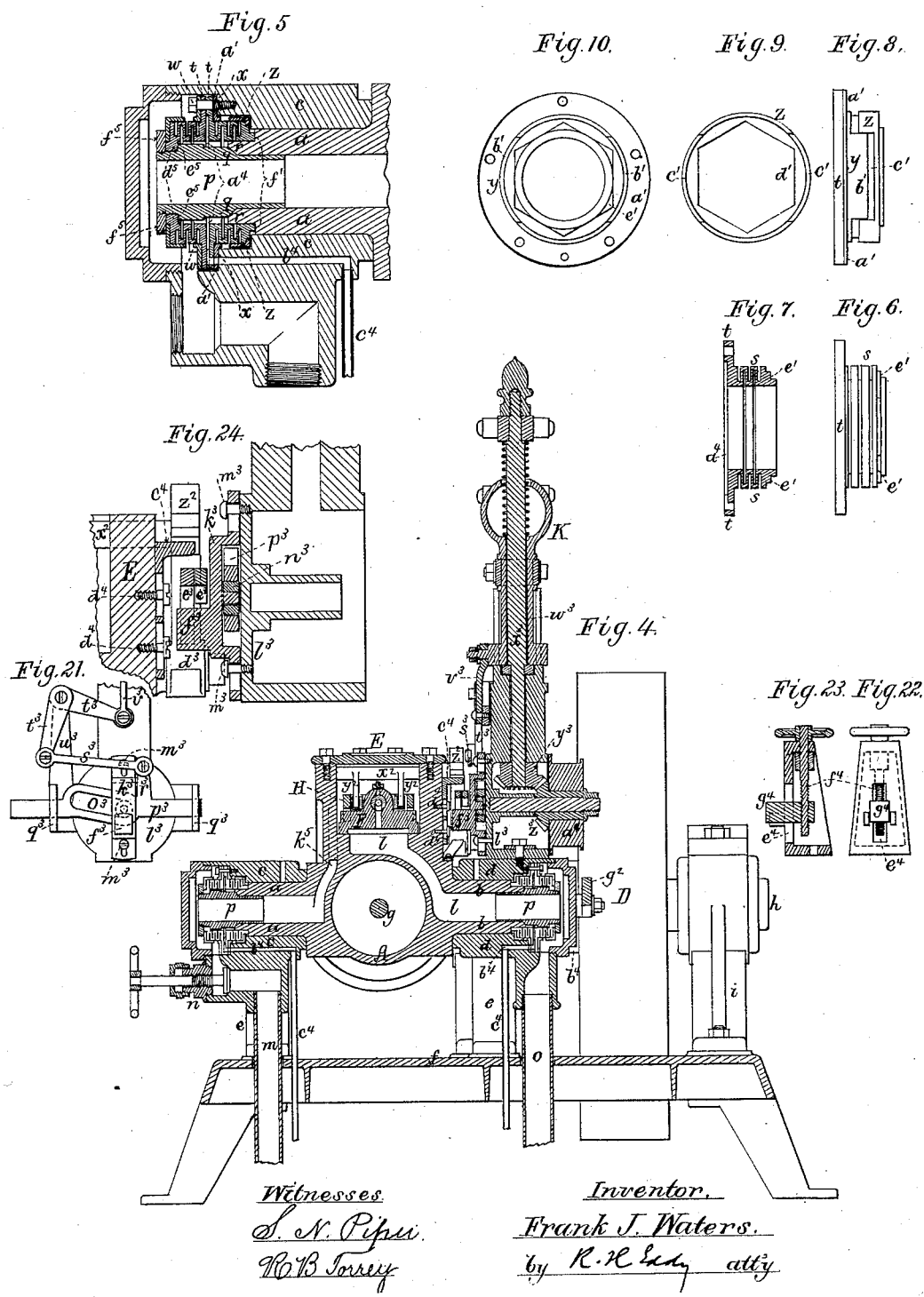
Witnesses
S. N. Piper
H. B. Torrey
Inventor
Frank J. Waters
by R. H. Eddy atty (No Model.) 5 Sheets—Sheet 4.
F. J. WATERS.
OSCILLATING STEAM ENGINE.

No. 340,689. Patented Apr. 27, 1886.

Witnesses.
S. N. Piper
R. B. Torrey

Inventor.
Frank J. Waters.
by N. H. Eady atty.

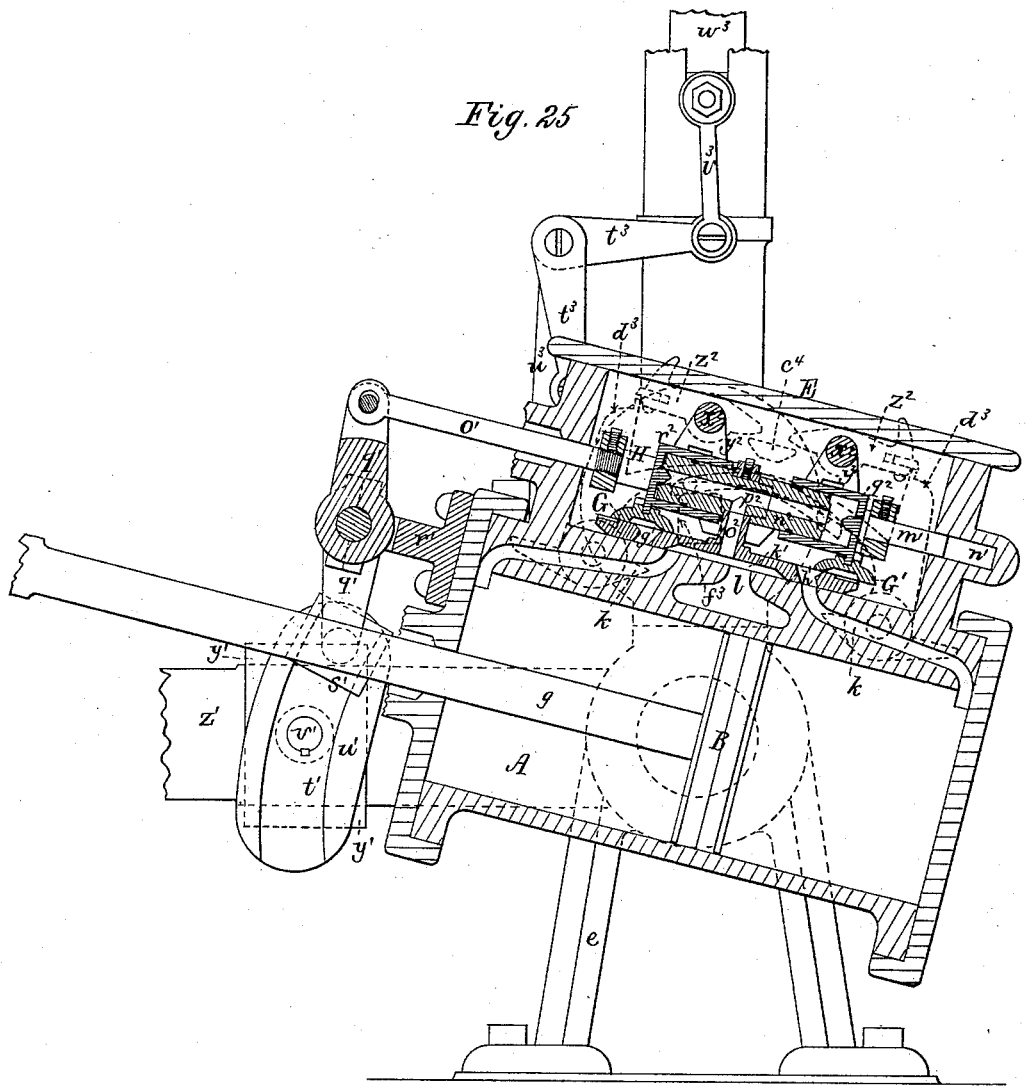

UNITED STATES PATENT OFFICE.

FRANK JOSEPH WATERS, OF PROVIDENCE, RHODE ISLAND.

OSCILLATING STEAM-ENGINE.

SPECIFICATION forming part of Letters Patent No. 340,689, dated April 27, 1886.

Application filed February 25, 1886. Serial No. 193,171. (No model.)

*To all whom it may concern:*

Be it known that I, FRANK JOSEPH WATERS, of the city and county of Providence, in the State of Rhode Island, have invented a new and useful Improvement in Oscillating Steam-Engines; and I do hereby declare the same to be described in the following specification and represented in the accompanying drawings, of which—

Figure 1:
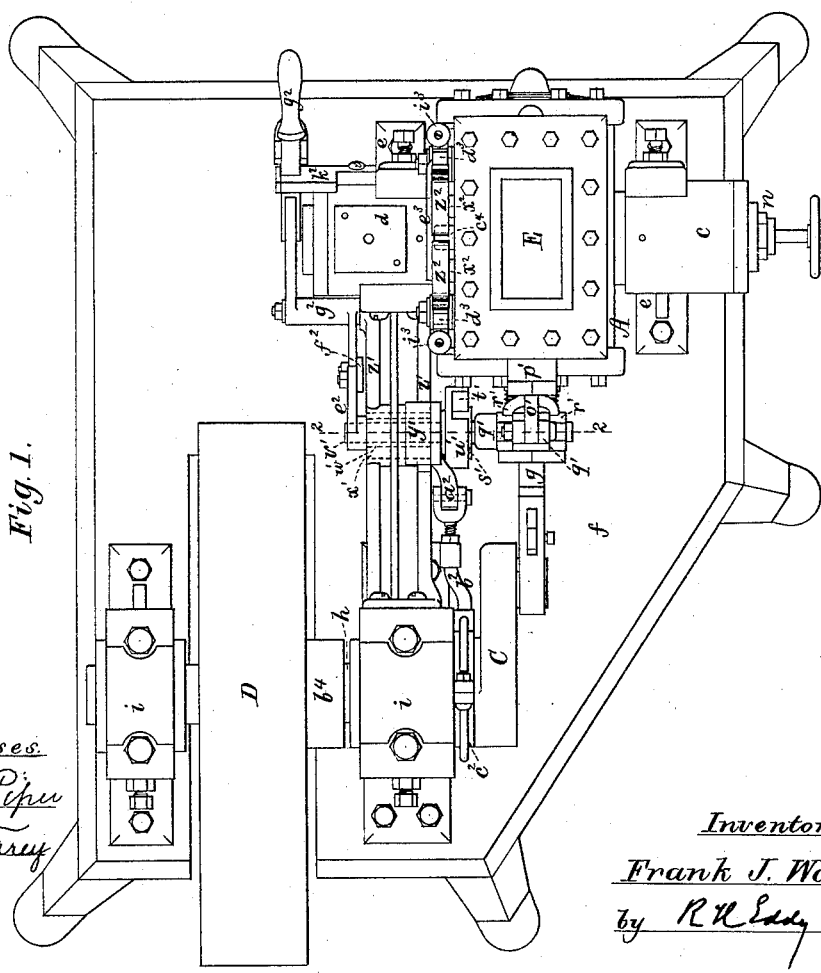
Figure 19:
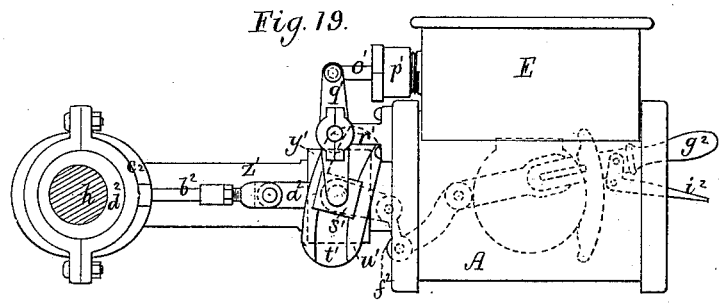
Figure 20:
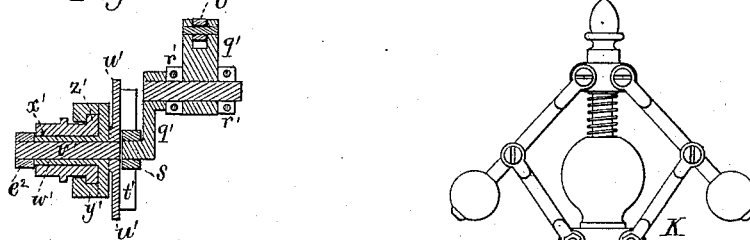
Figure 11:
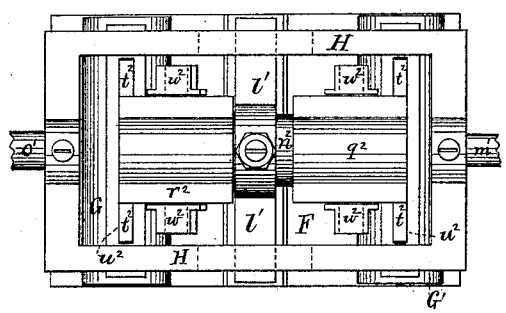
Figure 16:
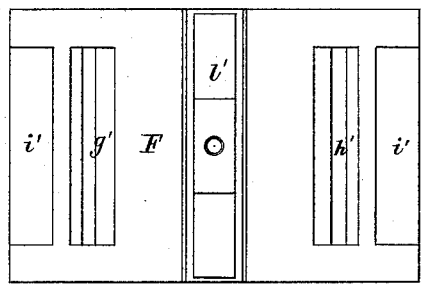
Figure 12:
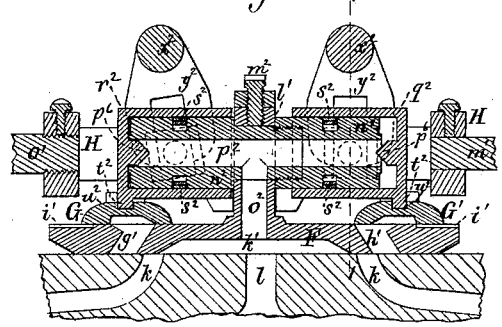
Figure 15:
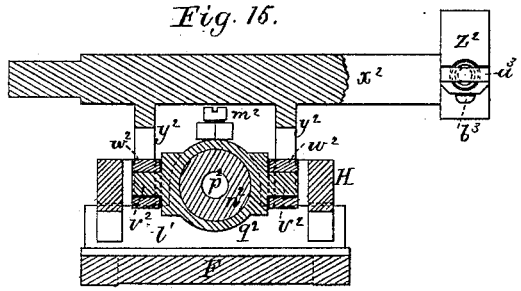
Figure 13:
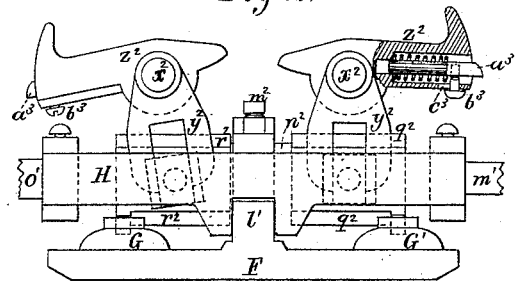
Figure 18:
Figure 17:
Figure 14:
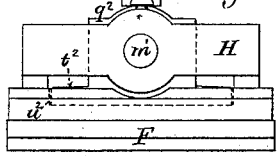

Figure 1 is a top view, and Fig. 2 a side elevation, in part, of an engine provided with my invention, the nature of which is defined in the claims hereinafter presented. Fig. 3 is a longitudinal and vertical section of such engine, taken through its piston-rod, steam-cylinder, and valve-chest. Fig. 4 is a transverse and vertical section taken through the axes of the trunnions of the steam-cylinder. Fig. 5 is a longitudinal and vertical section, on an enlarged scale, of one of the trunnions of the steam-cylinder, together with its supporting bearing or box and the compound metallic packing of such trunnion. Fig. 6 is a side view, and Fig. 7 a transverse section, of one of the sections of the said metallic packing. Fig. 8 is a side view of one section of the metallic packing with its re-enforce. Fig. 9 is an end view of the outer of the two sections composing the said re-enforce. Fig. 10 is an end view of the inner of such sections, together with the packing-section next adjacent to it. Fig. 11 is a top view; Fig. 12, a vertical, longitudinal, and median section; Fig. 13, a side elevation, and Fig. 14 an end view, of the main and auxiliary valves and their operating-yoke, such parts being situated within the valve-chest of the steam-cylinder. Fig. 15 is a transverse and vertical section on the line 1 1 of Fig. 12. Fig. 16 is a top view of the main valve. Fig. 17 is a top view, and Fig. 18 a bottom view, of one of the auxiliary valves. Fig. 19 is a front view of main valve reversed and the mechanism for imparting to it a reciprocating rectilinear motion, the mechanism for turning or partially revolving the said reverser being shown in such figure in dotted lines and in full lines in Figs. 1 and 2. Fig. 20 is a vertical section through said reverser and its supporting mechanism, the plane of such section being on the line 2 2 of Fig. 1. Fig. 21 is a side view of mechanism connected with the governor, to be described, and being for operating the tappets that sustain the auxiliary valves in position. Fig. 22 is a front elevation, and Fig. 23 a vertical, median, and transverse section, of what is generally termed a "set cut-off," the purpose of which and its application are hereinafter explained. Fig. 24 is a vertical section, on an enlarged scale, of the lower part of the case of the governor and a portion of the valve-chest, to be described. Fig. 25 illustrates, on an enlarged scale, a longitudinal, median, and vertical section of the cylinder and valve-chest and its main and cut-off valves, together with the yoke H, also in cross-section, the shafts $x^2$ $x^2$, the dogs $z^2$, which are secured to said shafts, the tappets $d^3$, with their curved arms $e^3$, and the stud $f^3$, which is connected with the governor, being shown in dotted lines.

In the drawings, A denotes the steam-engine cylinder, which at its middle is provided with two trunnions, $a$ and $b$, (see Fig. 4,) extending from it horizontally in opposite directions, they resting in stationary bearings $c$ and $d$ of two standards, $e$, erected on a suitable base, $f$. The piston of the cylinder is shown at B, Fig. 3, its rod $g$ being jointed to the wrist of a crank, C, fixed on a driving-shaft, $h$. The said shaft is provided with a fly-wheel, D, that, when the engine is in use, serves, by means of an endless belt, to transmit motion to any mechanism to be operated by such engine. The shaft $h$ is supported, as usual, in proper bearings in the upper parts of two standards, $i$.

The induction-passages of the cylinder are shown at $k$, and the exhaust or eduction at $l$. (See Fig. 3.) The passages $k$ open at their ends into the steam-cylinder A and valve-chest E, said valve-chest communicating with the bore of the trunnion $a$ by passages $k^5$, one of which is shown in Fig. 4, while the passage $l$ leads into the bore of the trunnion $b$, each trunnion being tubular. The bearings or boxes $c\,d$, in which the said trunnions are situated, are closed in front of the ends of the trunnions. A conduit, $m$, opening into one of the said bearings and provided with a stop-cock, $n$, (see Fig. 4,) serves to convey steam from a boiler into the chamber of the bearing and thence into and through the trunnion of such bearing and through the passages $k^5$ to the valve-chest. There opens out of the box or bearing of the other trunnion an eduction-pipe, o.

In order to prevent leakage of steam at the inner end of such trunnion-bearing, there is a compound metallic packing arranged in the chamber of the box, such packing being shown on an enlarged scale in Figs. 5, 6, 7, 8, 9, and 10. This packing surrounds and is secured to the outer end of a sleeve, p, formed in longitudinal section, and extending into and out from the trunnion, in manner as shown in Fig. 5. The sleeve has a conical shoulder, q, to bear against a similarly-formed seat, r, at the end of the trunnion.

Each packing is composed of two short tubes, s, each of which has at one end a flange, t, each tube having a series of grooves made in it on its interior as well as on its exterior periphery, each groove extending entirely around the tube. Those of the bore of the tube are arranged between those of its external surface in manner as shown in Fig. 7, in which the tube is shown as provided with three outer and two inner grooves. By means of these grooves the tube becomes corrugated, so as to be slightly elastic lengthwise of it. The two elastic packing-tubes, arranged with their flanges end to end in close contact, encompass the sleeve p, and are fastened to the box c by screws w, that go through the flanges and screw into the box, and serve to force the outer flange into contact with the inner one, and the latter into contact with a flange, a', of the re-enforce y, hereinafter described, and said flange a' against a shoulder, x, within the box, all being as represented in Fig. 5.

Extending around each tube s of the elastic packing are two re-enforces, y and z, one, y, of which is a ring having a flange, a', of the same diameter with and to butt against the flange t of the packing. The other re-enforce, z, is a ring recessed or notched, as shown at c', to receive a projection, b', from the fellow re-enforce. This ring is flanged at its outer end, and has in the flange a polygonal opening, d', to receive a correspondingly-shaped projection, e', extending from the packing at its outer end. The said polygonal opening and flange operate to prevent the re-enforce z from revolving on the packing. The other re-enforce, in consequence of its projection b' entering the notch c' of the re-enforce z, will be prevented from turning upon the packing; but the re-enforce z can slide a little on the packing lengthwise thereof. The screws w go through the flanges t and a' of the packings and their re-enforces y. The outer packing has an internal flange, $d^5$, to bear against a shoulder, $e^5$, of the sleeve p, said packing being secured to the sleeve by a nut, $f^5$, so the inner packing bears at its inner end against a shoulder, f'', of the trunnion, all being as shown in Fig. 5. When the inner packing is fixed in place by the screws w, it should be contracted, so as to cause it to bear closely against the shoulder f''. The pressure of the steam against the outer end of the outer packing will force the packing against the shoulder $e^5$.

Within the valve-chest E of the steam-engine cylinder A are the main valve F and the two auxiliary or cut-off valves G G', the latter being over or to operate with the two ports g' and h' of the valve F.

In the top of the valve F, at each end thereof, is a shallow rectangular recess, i', and in such valve, in the bottom thereof, is another recess, k', for the exhaust-steam to escape from either passage k into the passage l.

Extending upward from and across the main valve F at its middle is a rib, l', which is straddled by a rectangular frame or yoke, H. (See Figs. 11 and 13.) From one end of this yoke a guide-rod, m', extends into a cylindrical aperture, n', in one end of the valve-chest. From the middle of the other end of such yoke another rod, o', leads through a stuffing-box, p', to and is jointed to the upper arm of a lever, q'. (See Figs. 3, 19, and 20.) The said lever is fulcrumed to a bracket, r', extending from the cylinder-head. The lower arm of the said lever is journaled in a bearing or box, s', that slides within the curved groove t' of the main valve-reverser u'. This reverser is a block having in its front face the said groove t', whose radius has its center in the line going through the axes of the two trunnions of the cylinder. At its middle the reverser is fixed to one end of a short horizontal shaft, v', (see Fig. 20,) such shaft being shown in dotted lines in Fig. 1. The said shaft v' extends through and takes a bearing on a short tube or sleeve, w', extending into and through a short slot, x'. (See Fig. 2.) The said sleeve projects from a slide, y', adapted to slide rectilineally on a straight horizontal rail, z', extending from one trunnion-box to the next adjacent standard, i. The slide y' has projecting from it an arm, $a^2$, which is jointed to a rod, $b^2$, projecting from a collar, $c^2$, encompassing an eccentric, $d^2$, fixed on the driving-shaft h. (See Figs. 1 and 19.) There projects from the shaft v' at its rear end an arm, $e^2$, which, by a link, $f^2$, (see Fig. 2,) is connected with the shorter arm of the reversing-lever $g^2$, fulcrumed to the rail z'. Within the longer arm of the said lever is a slide-bolt, $h^2$, provided with a lever, $i^2$, (see Fig. 2,) for moving it, the said bolt, either into or out of a stationary curved rack, $k^2$, arranged as shown in Figs. 1 and 2, and fastened to the next adjacent trunnion-box. By turning the lever $g^2$ to its highest position, as shown in Fig. 19, the grooved reverser u' will be tipped or turned a little into the position shown in Fig. 19, in which case the main valve F will be in position, as shown in Figs. 3 and 12, with respect to the passages k, leading from the valve-chest to the ends of the bore of the engine-cylinder. Now, should it be desirable to reverse the motion of the piston, so as to cause the driving-shaft to revolve in an opposite direction to that in which it may at the time be revolving, the longer arm of the lever $g^2$ should be moved to its lowest position and locked therein by means of the bolt and curved rack. By so depressing the said longer arm the grooved reverser $u'$ will be turned in the opposite way to which it was before moved. When the lever $g^2$ is in one extreme position, (shown in Fig. 19,) the fly-wheel will be revolving in the direction denoted by the arrows $l^2$, (see Fig. 3;) but by putting the said lever in its other extreme position the fly-wheel will be caused to revolve in the opposite direction, provided the crank C and the piston-rod are not on "dead-centers." In revolving the eccentric $d^2$ causes the slide $y'$ to be moved rectilineally with a reciprocating motion on the rail $z'$, whereby the reverser $u'$ will also have imparted to it such a movement with the slide. In the meantime the lever $q'$ will be moved, and will correspondingly move the yoke H, and with it the main valve F, such movement of the main valve being equal to the distance which either auxiliary valve laps over the ports $g'$ or $h'$ of said main valve. While the cylinder is oscillating and the reverser $u'$ is inclined, as shown in Fig. 19, the lever $q'$ will be moved with the cylinder, and, as the said lever is journaled in the box $s'$, such box, in moving within the reverser, will move the lever so as to cause the main valve to have an additional movement in the same direction as that imparted to it by the eccentric $d^2$. The first movement of the main valve or that by the eccentric is the extent of what is termed the "lap" of the auxiliary valve G or G' over the port of the main valve, the second movement or remainder of the stroke of the main valve being completed by means of the reverser acting on box $s'$. Such second movement is to carry the port $g'$ or $h'$ of the main valve fully over the passage $k$, next thereto, and for leading steam to the cylinder at one end thereof. The said auxiliary valve G or G', that is next to the said passage $k$, where the steam is about to enter, is held stationary relatively to the main valve while the latter is moved as described.

Extending through the rib $l'$ at its middle, and fastened to it by a set-screw, $m^2$, is a cylindrical tube, $n^2$, such tube projecting from each side of the rib a like distance. Leading upward within the said rib, and from the exhaust-recess $k'$ of the main valve, is a passage, $o^2$. (See Figs. 3 and 12.) This passage opens into the bore $p^2$ of the said tube. Two cylindrically-chambered boxes, $q^2$ and $r^2$, receive the tube $n^2$, which at each end enters one of such boxes, there being around the tube, and between it and the periphery of the chamber of the box, a metallic or other proper packing, $s^2$, from which it will be seen that the tube, moving with the main valve, moves within the boxes $q^2$ and $r^2$, with steam-tight joints. Each of said boxes is provided with a conically-pointed stud, $p^6$. (See Fig. 12.) Such stud, when the end of its box is against the end of the tube $n^2$, enters and fills the end of the passage $p^2$. A lip, $t^2$, from each of the said boxes extends downward into a groove, $u^2$, in the auxiliary valve G or G', under the said box. Each box has two trunnions, $v^2$, projecting from its opposite sides, (see Fig. 15,) such trunnions going into boxes $w^2$.

Over each of the boxes $q^2$ and $r^2$ there is a shaft, $x^2$, which at its ends is journaled in the sides of the valve-chest, or in boxes fastened thereto. Fig. 4 shows one, and Figs. 2 and 3 both, of the said shafts in position. Each of them has two forks, $y^2$, extending down from it and embracing the boxes $w^2$, that receive the trunnions $v^2$. Each shaft extends at one end out of the valve-chest, and there has fixed on it a dog, $z^2$, shaped as shown in Figs. 2, 13, and 15. Within the longer arm of each dog is a spring-bolt, $a^3$, which projects a short distance out of the end of the dog, and is limited in its movements by a screw, $b^3$, that extends up through a slot, $c^3$, (see Fig. 13,) in the dog, and is screwed into such bolt.

Figure 2:
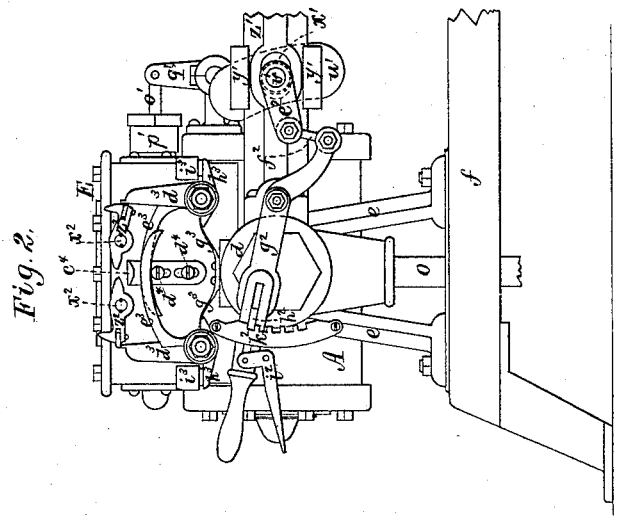
Figure 3:
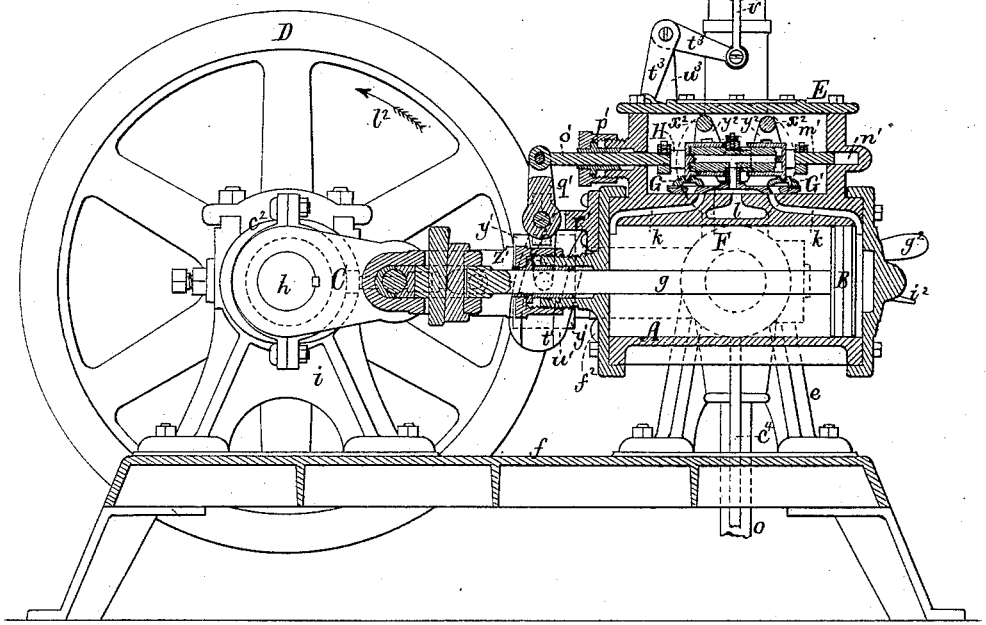

Pivoted to the valve-chest on the exterior thereof are two tappets, $d^3$, shaped as shown in Fig. 2, upon the top of which the dogs rest, as represented in said figure. Part of each tappet is an arm, $e^3$, curved or shaped as represented. When the cylinder is horizontal, as shown in Fig. 2, each arm projects somewhat below the other, as shown, and they retain such position with relation to each other while the cylinder is oscillating until the governor has attained sufficient speed to raise the stud $f^3$ into contact with them successively. These arms $e^3$ lap on each other, and both extend over and upon a stud, $f^3$. (See Figs. 4 and 24.) A spring, $g^3$, applied to both tappets, as shown in Fig. 2, causes projections $h^3$ from them to bear upward against stops $i^3$, projecting from the valve-chest. The aforesaid stud $f^3$ extends from a slide, $k^3$, (see Figs. 4, 21, and 24,) which is secured to the governor-case $l^3$ by two headed screws, $m^3$, that extend through slots in the slide and screw into the said case. The said slide, at its middle, carries a friction-roller, $n^3$, (see Fig. 24,) which is pivoted to the slide and projects into an inclined slot, $o^3$, (see Fig. 21,) in a slide, $p^3$, adapted to move rectilineally and horizontally in two ears or brackets, $q^3$, projecting from the governor case $l^3$. From the said slide an arm, $r^3$, extends upward, and is jointed to a rod, $s^3$, at one end thereof, such rod, at its other end, being jointed to a bell-crank, $t^3$, fulcrumed to an arm, $u^3$, projecting upward from the governor-case $l^3$. The said crank is pivoted to a rod, $v^3$, (see Figs. 3 and 21,) which in turn is pivoted to the vertically-moving sleeve $w^3$ of a centrifugal ball-governor, K, (see Figs. 3 and 4,) of ordinary construction. The spindle $x^3$ of this governor has on its lower end a bevel-gear, $y^3$, to engage with another such gear, $z^3$, carried by a pulley, $a^4$. (See Fig. 4.) In practice an endless belt extends about the pulley $a^4$ and another pulley, $b^4$, fixed on the driving-shaft $h$.

Directly under the inner arms of the two dogs $z^2$ there is an adjustable stop, $c^4$, (See Figs. 2, 4, and 25.) It is secured to the valve-chest by screws $d^4$, going through a slot or slots in such stop and screwed into the chest. The purpose of this stop is to limit the movements of the dogs in order to limit those of the cut-off or auxiliary valves G G' in directions from the middle of the main valve.

From the above it will be seen that the steam-engine cylinder while in operation has an oscillating movement, and that the main valve has imparted to it reciprocating rectilinear motions, such motions being effected by the eccentric $d^2$, the collar $c^2$, connecting-rod $b^2$, slide $y'$, reverser $u'$, box $s'$, lever $q'$, valve-stem $o'$, and yoke H. Furthermore, that the reverser has connected with it mechanism for effecting with it a reversal of the motion of the engine, as hereinbefore stated, such mechanism consisting of the lever $g^2$, slide-bolt $h^2$, lever $i^2$, curved rack $k^2$, link $f^2$, arm $e^2$, and shaft $v'$.

The mechanism for actuating the auxiliary or cut-off valves G G' by means of the governor consists of cylindrical tube $n^2$, (fastened to the main valve and opening into the exhaust-chamber $k'$ of the main valve by the passage $o^2$,) the cylindrically-chambered boxes $q^2$ and $r^2$, (applied to the valves G G' by means as described, and provided with trunnions $v^2$,) boxes $w^2$, the two shafts $x^2$, with their forks $y^2$, and dogs $z^2$, tappets $d^3$, (having curved arms $e^3$, and projections $h^3$,) spring $g^3$, stops $i^3$, stud $f^3$, slide $k^3$, (provided with the friction-roller $n^3$,) slotted slide $p^3$, with its arm $r^3$, connecting-rod $s^3$, bell-crank $t^3$, arm $u^3$, and rod $v^3$, the latter being pivoted to the sliding sleeve $w^3$ of the governor K. Should the load on the engine be diminished, the governor will be revolved at a faster speed. As a consequence its sleeve $w^3$ will be raised, the bell-crank $t^3$ will be turned, and the slide $p^3$ will be moved lengthwise of it in one direction. By its inclined slot $o^3$ and the friction roller $n^3$ therein such slide will force upward the slide $k^3$, with its stud $f^3$, carrying the latter into contact with and causing it to force upward one of the arms $e^3$ of the tappets, thereby moving such tappet from underneath and against the dog $z^2$, held stationary by it. On such dog being so released the pressure of the steam in the valve-chest will force one of the chambered boxes $q^2$ $r^2$ inward against the next adjacent end of the tube $n^2$, and in so doing will move the auxiliary valve G or G' over the port next below it, and thereby shut off the steam from passing into the passage $k$, next such valve, and thence to the cylinder, in the movement of the main valve the dog will be raised or turned back to a position to be locked by the tappet, which, by the spring $g^3$, will be forced back to place, so as to cause its arm to be against its stop $i^3$. When the dog is locked, its spring-bolt rests on the top of the tappet. On the tappet being moved away from the bolt, the dog will be free to move downward. As the dog rises the bolt will be forced backward in it without hinderance from the tappet, the bolt springing outward as soon as it may rise above the tappet. Should the load on the engine be increased, the speed of the governor will be decreased, and as a consequence the stud $f^3$ will be depressed more or less, and the valves will be operated so as to allow more steam to enter the cylinder as may be required. When the main valve is moving in either direction, the auxiliary valve at its advance end moves with the main valve, and the other auxiliary valve, which is over the port into which the steam is to enter the cylinder, remains at rest until the period when the steam is to be cut off, the valve then moving and closing the port. We will now suppose the fly-wheel of the engine to be revolving in the direction indicated by the arrow $l^2$ in Fig. 3. When the cylinder has reached a horizontal position, as shown in said Fig. 3, or as the end of the cylinder nearest the driving-shaft has been moving up to said position, the main valve F has been moved under the valve G' in a direction toward the left a distance equal to the lap of the said valve G' over the port $h'$ of said main valve, (see Figs. 3 and 12,) and the port $h'$ has opened a little over the passage $k$ beneath it. The movement referred to of said valve F has been effected by the eccentric $d^2$ (the throw of which is in the same direction with the crank C) and its collar $c^2$, the connecting-rod $b^2$, slide $y'$, reverser $u'$, box $s'$, lever $q'$, valve-stem $o'$, and yoke H. The reverser has thus far caused no movement of the valve F under the valve G' of itself, except such as has been imparted to it, the reverser, by the slide $y'$, to which it is pivoted. Now, as soon as the dead-center is passed and the cylinder continues to move toward the position shown in Fig. 25, the box $s'$ will ascend the curved groove $t'$ in the reverser, and as the cylinder reaches said position will have moved the valve F by means of the lever $q'$, stem $o'$, and yoke H to the left and opened wide the port $h'$ from under the valve G'. (See Fig. 25.) While the movement of the valve F to the left, which has just been described, has been going on the cut-off valve G' and the box $q^2$, to which it is attached, have been held from moving by the forks $y^2$, shaft $x^2$, dog $z^2$, connected therewith, and the tappet $d^3$, (see Fig. 25;) and should the tappet and dog of the valve G remain in the position shown in said Fig. 25 while the cylinder oscillates in the opposite direction, the said valve G will be held from moving while the valve F moves to the right, in like manner as was the valve G' when the valve F moved to the left. It will be observed that the valve F when in operation moves back and forth under the valves G and G', and the tube $n^2$ moves to the right and left, or in opposite directions, in the boxes $q^2$ and $r^2$, while the speed of the engine is such as to not require the flow of steam to be cut off; but when the speed of the engine increases sufficiently to cause the balls of the governor to spread, and by the mechanism connected with them to raise the stud $f^3$, so that as the cylinder oscillates the parts of the curved arms $e^3$ of the tappets which project below one another (see Fig. 2, also shown in dotted lines in Fig. 25) will bear upon and be raised successively by said stud, and the tappets will be turned on their pivots and the dogs allowed to fall, and the valves G G' so moved by the steam as to cut off the flow thereof into the cylinders, as will now be more minutely described.

In Figs. 3 and 12 the valve F is to be supposed to be moving to the left. The valve G' being prevented from moving, as was above described, the valve G is then moving to the left with the main valve F, and is in the position with relation to the said main valve that it would have, had it cut off the steam from the port $g'$ in the preceding movement of the valve F to the right. As the valve F moves along under the valve G', and sufficient steam has entered the cylinder through the port $h'$ to so increase the speed of the engine as to cause the governor to raise the stud $f^3$ against the eccentric part of arm $e^3$ of the tappet $d^3$, which is preventing the valve G' from moving, the instant the tappet releases the dog $z^2$ of the said valve G' the steam will force the box $q^2$ of such valve against the end of the tube $n^2$, (and consequently close the port $h'$,) and as the chamber $p^2$ of such tube $n^2$ is filled with exhaust-steam the stud $p^6$ of said box on entering said chamber $p^2$ will retain enough of the exhaust-steam between the ends of the said tube and box to act as a cushion and prevent the box from striking against the tube too forcibly. During the movement of the valve G to the left with the main valve, the shaft $x^2$, over said valve G, (which shaft is connected with its box $r^2$ by forks $y^2$, see Fig. 12,) has been turned in its bearings, and its dog $z^2$ (which was below the tappet when said valve commenced its movement to the left, as seen in Fig. 2) has been turned up, so as to carry its spring-bolt over the top of its tappet, as seen in Fig. 25 in dotted lines. Now, in the opposite movement of the main valve—that is, to the right—the valve G will be held from moving until released to cut off the steam, and the valve G', which is now against the end of the tube $n^2$, will be carried to the right and its dog $z^2$ locked over its tappet $d^3$.

Within the flange $t$ (see Figs. 5 and 7) of each packing-tube $s$ there is an annular rabbet, $a^4$, which, when the two flanges are together, forms an annular chamber from which a passage, $b^4$, extends lengthwise through the trunnion-bearing and opens into a vertical pipe, $c^4$, such chamber, passage, and pipe being to conduct away from the trunnion-bearing any water that may rise therein from condensation of steam.

In Figs. 22 and 23 I have represented, as before mentioned, a set cut-off, which consists partly of a standard, $d^4$, slotted on its front, as shown at $e^4$. Within this standard there is pivoted a screw, $f^4$, it being arranged as shown, and screwed down through a block, $g^4$. When the set cut-off is used, the governor is to be supposed to be removed, or not in place, as shown, relatively to the rest of the engine, the set cut-off being substituted for the governor, in which case the block $g^4$ is to take the position of the stud $f^3$, hereinbefore described. By means of the screw $f^4$ the block $g^4$ can be adjusted in altitude relatively to the tappets, in order to effect the cutting off of the steam at the proper time or times.

In the engine hereinbefore described I claim—

1. The combination, with each tubular trunnion $a$ or $b$ of the steam-engine cylinder, and with the chambered bearing or box of such trunnion, of the sleeve $p$, arranged in such bearing and trunnion, and of the flanged and corrugated compound metallic packing, substantially as described, applied to such sleeve and trunnion and the bearing of the latter and to operate therewith, essentially as set forth.

2. The combination of the re-enforces $y$ and $z$, substantially as described, applied to each tube $s$ of the compound elastic packing, with such packing, and with the tubular trunnion of the steam-engine cylinder, the chambered bearing or box of such trunnion, and the sleeve arranged in such bearing and trunnion, all being substantially as described.

3. The combination for moving the main valve, it consisting in the eccentric $d^2$, collar $c^2$, connecting-rod $b^2$, slide $y'$, reverser $u'$, box $s'$, lever $q'$, valve-stem $o'$, and yoke H, such eccentric being fixed on the driving-shaft, and all being arranged and to operate substantially as set forth.

4. The combination, with the reverser and the rest of the mechanism for imparting to the main valve its reciprocating motions, of the mechanism for effecting a reversal of the motion of the engine, and consisting of the lever $g^2$, slide-bolt $h^2$, lever $i^2$, curved rack $k^2$, link $f^2$, arm $e^2$, and shaft $v'$, all being substantially as set forth.

5. The combination, substantially as described, for actuating the auxiliary or cut-off valves G G' by means of the governor K, it consisting in the cylindrical tube $n^2$, (fastened to the main valve and opening into the exhaust-chamber $k'$ thereof by the passage $o^2$,) the cylindrically-chambered boxes $q^2$ $r^2$, (applied to the valves G G' by means as described,) boxes $w^2$, the two shafts $x^2$, their forks $y^2$, and dogs $z^2$, the tappets $d^3$, (having curved arms $e^3$ and projections $h^3$,) spring $g^3$, stops $i^3$, stud $f^3$, slide $k^3$, (provided with the friction-roller $n^3$,) slotted slide $p^3$, (having an arm, $r^3$,) connecting-rod $s^3$, bell-crank $t^3$, arm $u^3$, and rod $v^3$, the latter being pivoted to the sliding sleeve $w^3$ of the governor K, and all being arranged and to operate essentially as represented.

6. The combination of the rabbets $a^4$ in the flanges of the tubes of the metallic packing of each trunnion and its sleeve, and the passage $b^4$ through the trunnion-bearing, with such trunnion, its bearing, and the said metallic packing, all being substantially as set forth.

7. The combination, substantially as described, for actuating the cut-off valves G G' by means of the set cut-off, as described, such combination consisting in the cylindrical tube $n^2$, (fastened to the main valve and opening into the exhaust-chamber $k'$ thereof by the passage $o^2$,) the cylindrically-chambered boxes $q^2 r^2$, (applied to the valves G G' by means as described,) boxes $w^2$, the two shafts $x^2$, their forks $y^2$, dogs $z^2$, and stops $i^3$, all being arranged and applied essentially as set forth.

8. The main valve constructed as described, provided with the ports $g' h'$, exhaust-chamber $k'$, and the depressions $i'$, rib $l'$, and the tube $n^2$, secured thereto and provided with the passages $p^2 o^2$, communicating with each other and with the said exhaust-chamber $k'$, in combination with the auxiliary or cut-off valves G G', and their operative boxes $q^2 r^2$, provided with trunnions, the valves G G' being so constructed as to admit steam from the valve-chest to the ports $g' h'$ in two directions.

FRANK JOSEPH WATERS.

Witnesses:
R. H. EDDY,
S. N. PIPER.